(12) United States Patent
Khan

(10) Patent No.: US 8,027,286 B2
(45) Date of Patent: Sep. 27, 2011

(54) MULTI-LAYER MULTI-HOP WIRELESS SYSTEM

(75) Inventor: Farooq Khan, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 11/768,999

(22) Filed: Jun. 27, 2007

(65) Prior Publication Data

US 2008/0025323 A1 Jan. 31, 2008

Related U.S. Application Data

(60) Provisional application No. 60/834,148, filed on Jul. 28, 2006.

(51) Int. Cl.
*H04B 7/14* (2006.01)

(52) U.S. Cl. .................................. 370/315; 375/261

(58) Field of Classification Search .................. 370/315; 375/261
See application file for complete search history.

(56) References Cited

U.S. PATENT DOCUMENTS

| 6,873,613 | B1 * | 3/2005 | Dent | 370/347 |
| 7,002,918 | B1 * | 2/2006 | Prieto et al. | 370/252 |
| 7,173,974 | B2 * | 2/2007 | Sindhushayana | 375/262 |
| 2005/0094588 | A1 * | 5/2005 | Wentink | 370/315 |
| 2005/0111580 | A1 * | 5/2005 | Walker et al. | 375/308 |

* cited by examiner

*Primary Examiner* — Jason E Mattis
*Assistant Examiner* — Benjamin Lamont

(57) ABSTRACT

The present disclosure relates generally to a system and method for a multi-layer multi-hop wireless system. In one example, the method includes dividing information to be sent from a source node to a destination node via a relay node into at least first and second segments. A signal containing the first and second segments is generated for transmission from the source node, where the first and second segments are encoded differently within the signal. The signal containing the first and second segments is sent from the source node to the relay node and the destination node. Only the first segment is recovered from the signal by the destination node, while the first and second segments are recovered by the relay node. The second segment is sent by the relay node to the destination node, which combines the first and second segments to reconstruct the information.

23 Claims, 10 Drawing Sheets

USER-1

USER-2

COMPOSITE SIGNAL

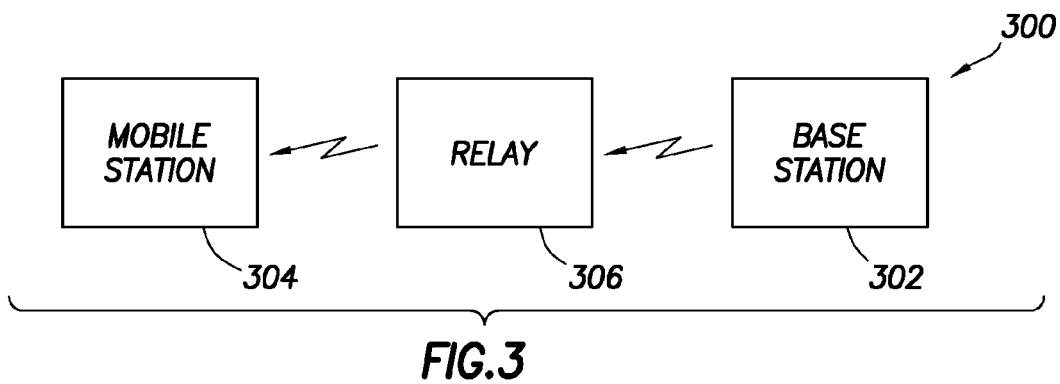
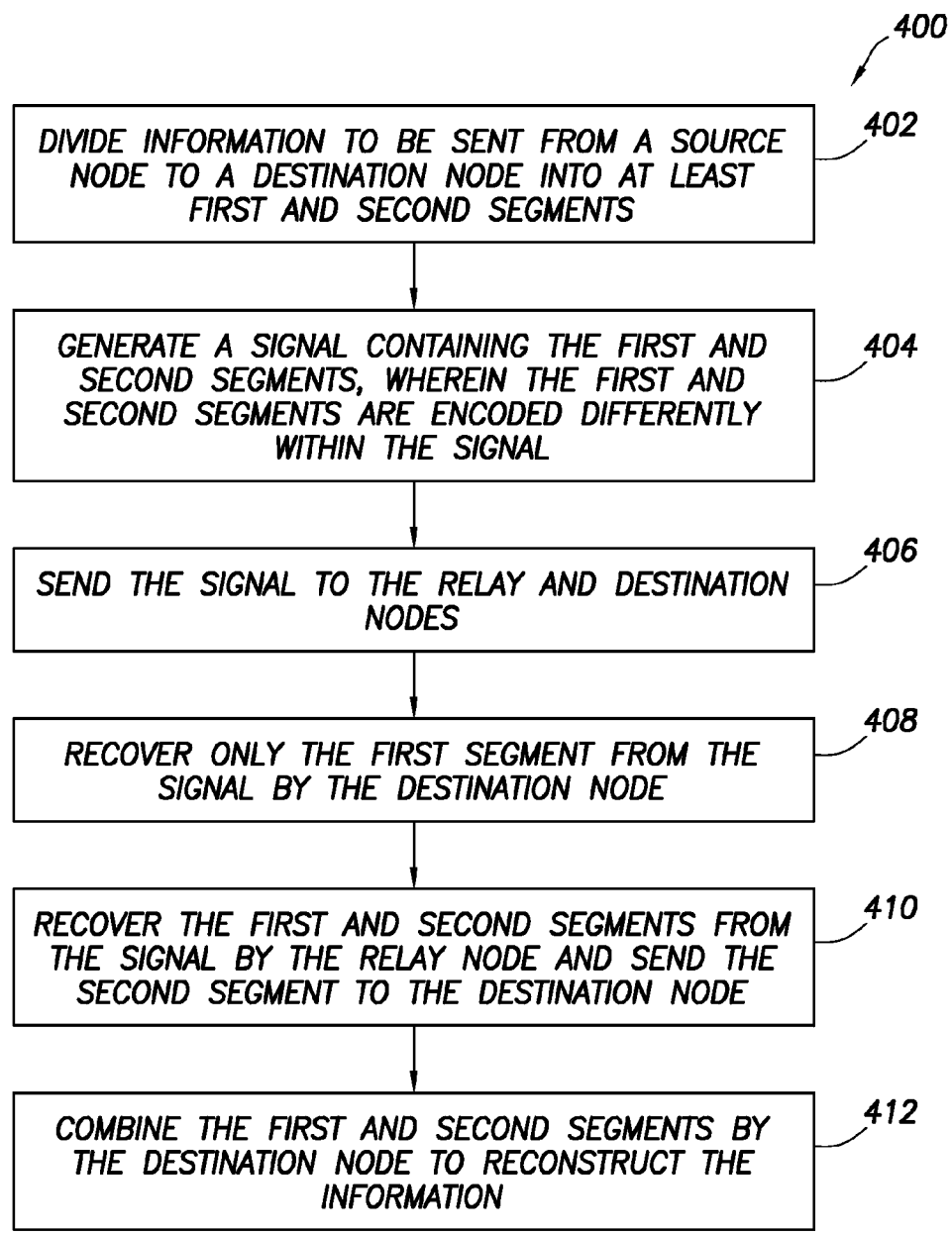

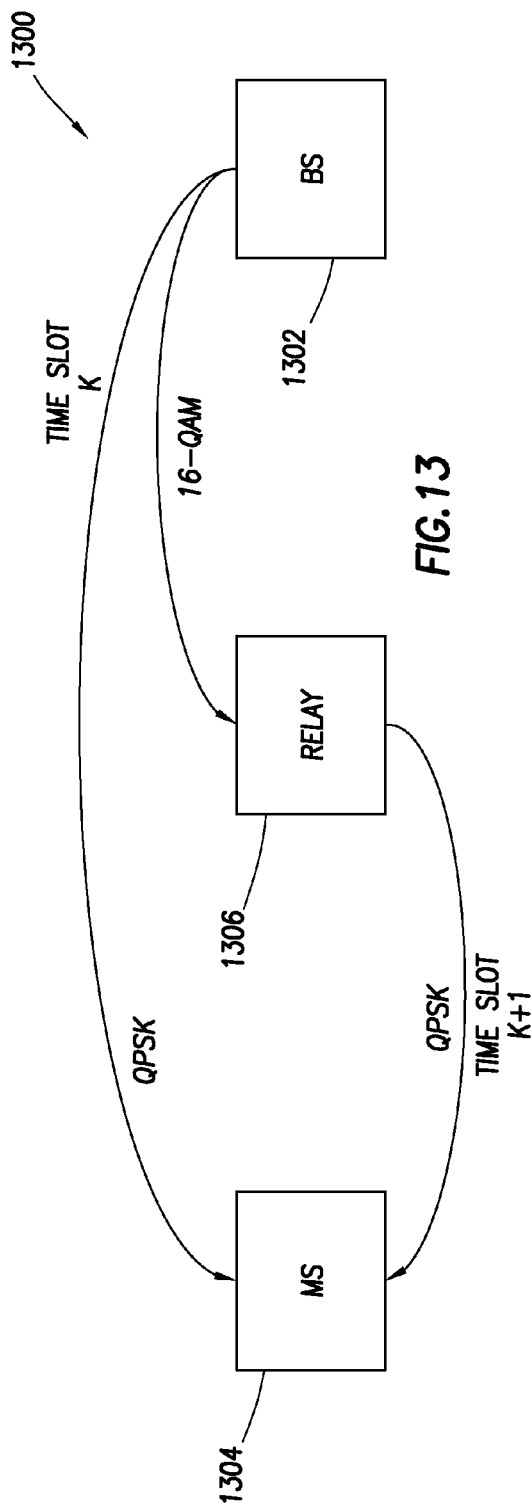
FIG.13
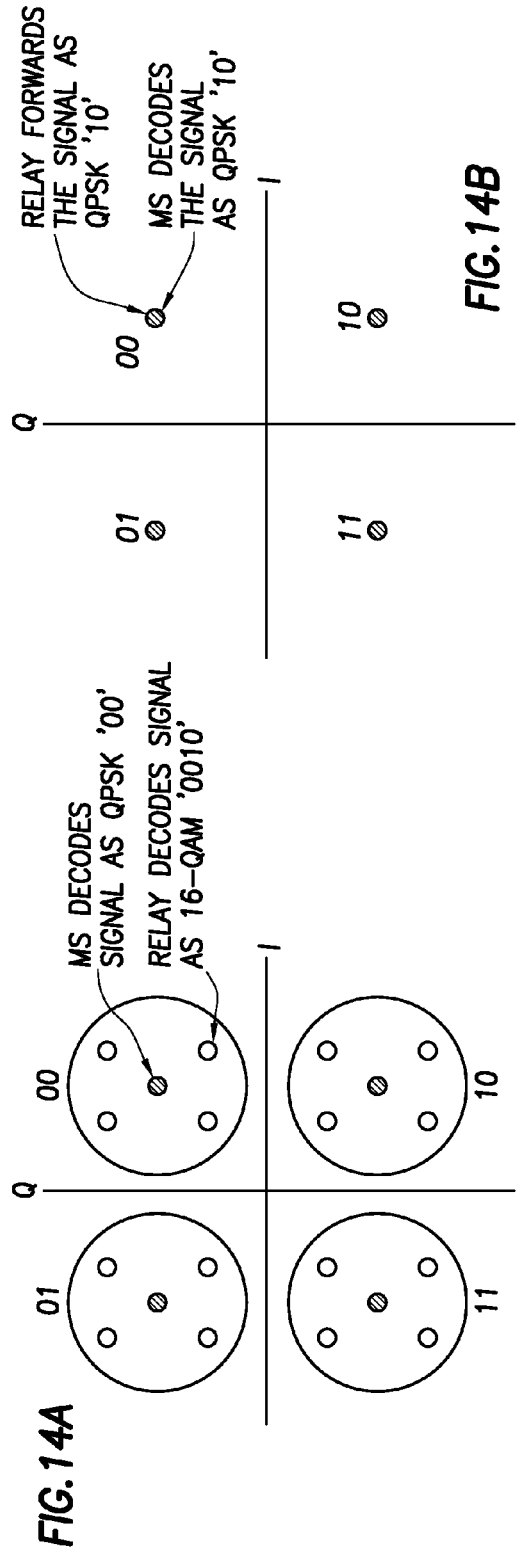
FIG.14A
FIG.14B

MULTI-LAYER MULTI-HOP WIRELESS SYSTEM

CLAIM OF PRIORITY

This application claims priority from U.S. Provisional Patent Application Ser. No. 60/834,148, filed on Jul. 28, 2006, which is incorporated by reference herein in its entirety.

BACKGROUND

In a wireless system, different methods may be used to extend the range of signals. For example, one or more relays may be used to receive and retransmit signals between a mobile station and a wireless system. Various communication methodologies may be used with such relays, such as the use of orthogonal channels for communication on different relay links. However, these methodologies may result in system inefficiency. Accordingly, it is desirable that such inefficiencies be addressed.

SUMMARY

In one embodiment, a method comprises dividing information to be sent from a source node to a destination node via a relay node into at least first and second segments. A signal containing the first and second segments is generated for transmission from the source node, wherein the first and second segments are encoded differently within the signal. The signal containing the first and second segments is sent from the source node to the relay node and the destination node. Only the first segment is recovered from the signal by the destination node. The first and second segments are recovered from the signal by the relay node and the second segment is sent to the destination node. The first and second segments are combined by the destination node to reconstruct the information.

In another embodiment, a method comprises segmenting data to be sent from a source node $N_1$ to a destination node $N_K$ via relay nodes $N_2, \ldots, N_{(K-1)}$ into data segments $D_1, D_2, \ldots, D_{(K-1)}$. A multi-layer message is created containing the data segments $D_1, D_2, \ldots, D_{(K-1)}$ so that data segment $D_1$ is in a different layer of the multi-layer message than data segment $D_{(K-1)}$ and will be decoded prior to data segment $D_{(K-1)}$, wherein data segment $D_1$ is encoded for destination node $N_K$ and data segments $D_{(K-1)}, \ldots, D_2$ are encoded in different layers of the multi-layer message than $D_1$ for relay nodes $N_2, \ldots, N_{(K-1)}$, respectively. The multi-layer message is sent to the relay nodes $N_2$ through $N_{(K-1)}$ and destination node $N_K$. Layers of the multi-layer message are decoded by each relay node $N_2, \ldots, N_{(K-1)}$ until the corresponding data segment $D_{(K-1)}, \ldots, D_2$, respectively, for each relay node $N_2, \ldots, N_{(K-1)}$ is decoded. Each relay node $N_2, \ldots, N_{(K-1)}$ sends the corresponding data segments $D_{(K-1)}, \ldots, D_2$ to the destination node $N_K$ and to the relay nodes remaining between the sending relay node and the destination node $N_K$.

In still another embodiment, a method comprises dividing information to be sent from a source node to a destination node via a relay node into at least first and second segments. Hierarchical modulation is used to create a signal containing the first and second segments for transmission from the source node, wherein the first segment is modulated using a first modulation scheme and wherein the second segment is modulated using a second modulation scheme. The signal containing the first and second segments is sent from the source node to the relay node and the destination node. The signal is demodulated by the relay node to recover the second segment. The second segment is modulated using a third modulation scheme and sent from the relay node to the destination node.

In yet another embodiment, a system comprises a source node having a first memory coupled to a first processor, at least one relay node having a second memory coupled to a second processor, and a plurality of instructions stored in the first and second memories for execution by the first and second processors. The instructions include instructions for dividing information to be sent from the source node to a destination node via the relay node into at least first and second segments; generating a signal containing the first and second segments for transmission from the source node, wherein the first and second segments are encoded differently within the signal; sending the signal containing the first and second segments from the source node to the relay node and the destination node; and recovering the first and second segments by the relay node and sending the second segment to the destination node, wherein the destination node is able to reconstruct the information by combining the first segment sent by the source node with the second segment sent by the relay node.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 3 is a diagram of one embodiment of a relay system.

FIG. 4 is a flowchart illustrating one embodiment of a method for efficiently sending information within the relay system of FIG. 3.

FIG. 13 is a diagram of an embodiment of a relay system that may use hierarchical modulation.

FIGS. 14A and 14B illustrate one embodiment of hierarchical modulation within a relay system.

DETAILED DESCRIPTION

Figure 1A:
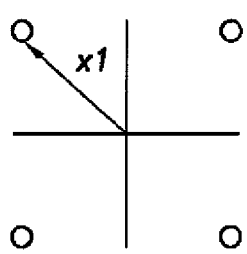
FIGS. 1A-1C illustrate superposition coding.

It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The following disclosure may describe various examples using superposition coding and/or hierarchical modulation. Examples of superposition coding and hierarchical modulation are described below.

Figure 1B:
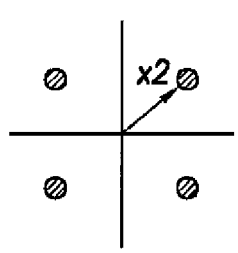
Figure 1C:
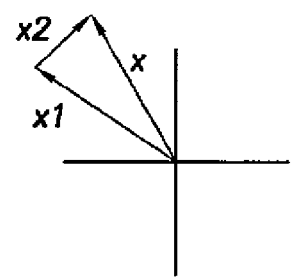

Referring to FIGS. 1A-1C, an example of superposition coding is illustrated. FIG. 1A illustrates a first user (User-1) associated with a first signal (signal x1) and FIG. 1B illustrates a second user (User-2) associated with a second signal (signal x2). As shown in FIG. 1C, signal x2 may be superimposed on signal x1, resulting in a composite signal x that is transmitted. At the receiver, User-2 may first decode signal x1, cancel it from the composite received signal x, and then decode its own signal x2. User-1 may decode its own signal x1 from the composite received signal x without any cancellation.

Figure 2A:
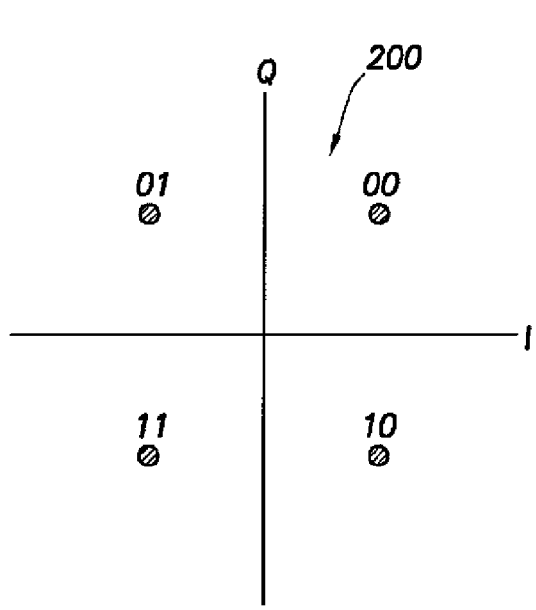
FIGS. 2A-2C are constellation diagrams illustrating Quadrature Phase Shift Keying (QPSK), Quadrature Amplitude Modulation (16-QAM), and hierarchical modulation of QPSK and 16-QAM, respectively.
Figure 2B:
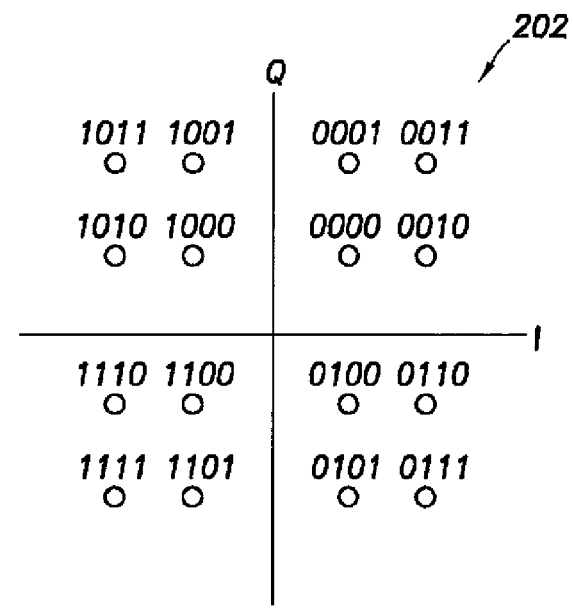
Figure 2C:
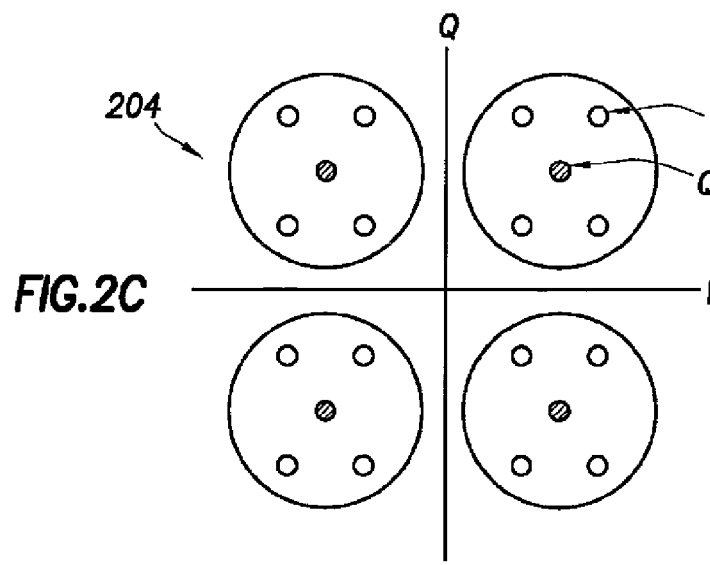

Referring to FIGS. 2A-2C, an embodiment of hierarchical modulation is illustrated. FIG. 2A illustrates a Quadrature Phase Shift Keying (QPSK) constellation diagram 200, and FIG. 2B illustrates a Quadrature Amplitude Modulation (e.g., 16-QAM) constellation diagram 202. A constellation diagram is a representation of a signal modulated by a digital modulation scheme (e.g., QPSK or 16-QAM). Transmitted symbols of the signal may be represented as complex numbers with real and imaginary parts, and so the symbols may be viewed as corresponding to points on the complex plane. As illustrated in FIGS. 2A and 2B, the real and imaginary axes may be called the in-phase or I-axis, and the quadrature or Q-axis. As is known, QPSK is a method of modulating digital signals using four phase states to code two digital bits per phase shift, and QAM is a modulation technique that uses amplitude and phase for data encoding. QPSK carries two bits per symbol while 16-QAM carries four bits per symbol.

In the present example, constellation diagram 204 of FIG. 2C illustrates a hierarchical modulation scheme with the QPSK constellation of FIG. 2A embedded within the 16-QAM constellation of FIG. 2B. This type of scheme may be used in broadcast systems such as terrestrial Digital Video Broadcasting (DVB-T) where a high priority (HP) stream is embedded within a low priority (LP) stream. Users with good channel quality can decode both the LP and HP streams, thereby improving the quality of the broadcast transmissions. Users with poor channel conditions can only receive the HP stream and thus receive the broadcast at a relatively degraded quality compared to the users with good channel quality. The users with good channel quality decode the signal as a higher order constellation such as 16-QAM, while the users with poor channel quality decode the signal as a QPSK constellation. In this example, the data rate for users with good quality who decode the signal as 16-QAM (four bits/symbol) is twice as large as the data rate for users decoding the signal as a QPSK constellation (two bits/symbol).

Referring to FIG. 3, one embodiment of a basic multi-hop relay system 300 that may use superposition coding and/or hierarchical modulation is illustrated. In the present example, the system 300 may be part of a cellular wireless network, but it is understood that the system 300 may be implemented in other types of networks. In the multi-hop system 300, communication between a source node 302 (e.g., a base station) and a destination node 304 (e.g., a mobile station) may be assisted by one or more intermediate nodes 306 (e.g., relay nodes). In general, the relay node 306 receives a signal from the base station 302, processes and amplifies the signal as needed, and transmits the signal to the mobile station 304. Similarly, in the reverse direction, the relay node 306 receives a signal from the mobile station 304 and transmits it to the base station 302 after performing processing and amplification as needed. The mobile station 304 may be any device capable of receiving and processing wireless communications, including but not limited to laptop or portable computers, personal digital assistants, pagers, and cellular telephones, and the base station 302 may be any system or system component capable of communicating with such devices.

Relays, such as the relay node 306, are generally characterized as analog relays or digital relays. With analog relays, also referred to as non-regenerative relays, a received signal may simply be amplified and forwarded to the destination node. With digital relays, also referred to as regenerative relays, information in the received signal may be demodulated/decoded and then encoded/modulated before the signal is amplified and forwarded to the destination node.

Furthermore, a relay based network architecture may be characterized as either a homogeneous relay network or a heterogeneous relay network. In a homogeneous relay architecture, a single common air-interface is generally used for the user and backhaul traffic. In a heterogeneous relay architecture, separate air-interfaces are generally used for the user and backhaul traffic.

In some examples, the mobile station 304 may have poor channel quality relative to the base station 302, thereby limiting the amount of information that can be sent from the base station to the mobile station due to the relatively low data rate. The relay node 306 may have good channel quality relative to the base station 302, and so may be able to receive a larger amount of information due to the relatively high data rate. The relay node 306 may also have good channel quality relative to the mobile station 304, and so the mobile station may be able to receive a larger amount of information from the relay node than from the base station 302.

Referring to FIG. 4, in one embodiment, a method 400 may use superposition coding and/or hierarchical modulation in a multi-hop wireless network, such as the system 300 of FIG. 3. Information is to be sent from a source node (e.g., the base station 302) to a destination node (e.g., the mobile station 304) via one or more relay nodes (e.g., the relay node 306). Although the present example is described using a single relay node, it is understood that it may be applied to a system having any number of relay nodes.

In step 402, the information to be sent from the source node to the destination node is divided into at least first and second segments. The segments may or may not be equal in size. In step 404, a signal is generated containing the first and second segments, with the first and second segments encoded differently within the signal. For example, the first segment may be encoded in a different layer of a message than the second segment in the case of superposition coding, or a constellation representing the first segment may be embedded in a different constellation representing the second segment in the case of hierarchical modulation. More specific examples will be described below.

In step 406, the signal containing the first and second segments is sent from the source node to the relay node and the destination node. The destination node recovers only the first segment from the signal in step 408, although it may receive the entire signal. In step 410, the relay node recovers both the first and second segments from the signal, and sends the second segment to the destination node. The destination node may then combine the first and second segments to reconstruct the information in step 412. Accordingly, multiple hops may be used to transmit the information from the source node to the destination node, and each hop may aid in efficient transmission by decoding and/or encoding part or all of the signal that was not recovered by the destination node.

Figure 5:
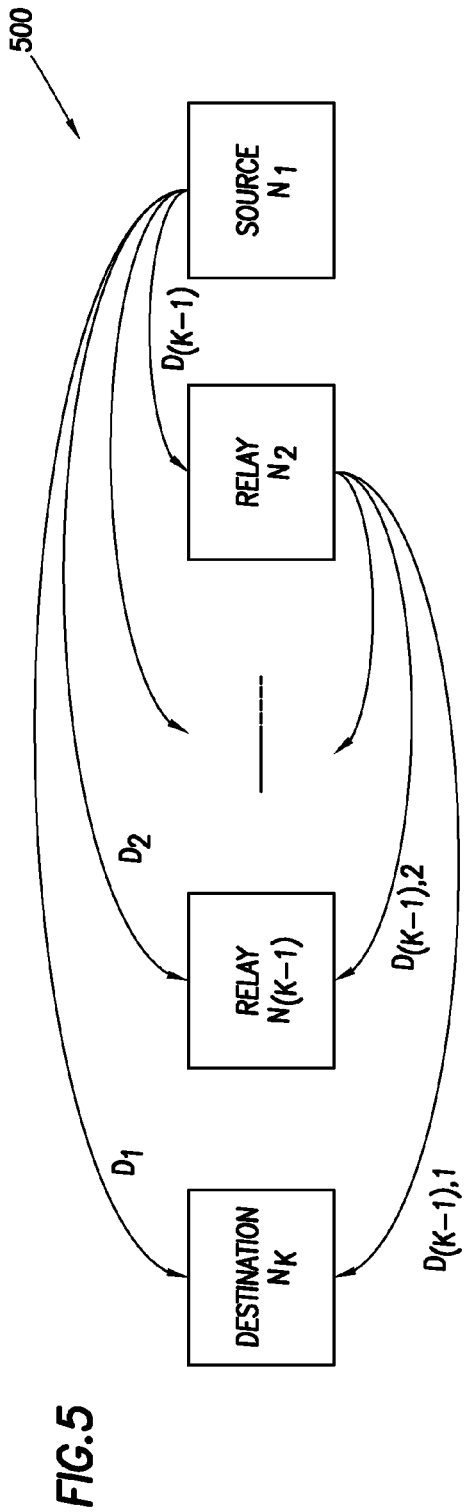
FIG. 5 is a diagram of another embodiment of a relay system.

Referring to FIG. 5, in one embodiment, a system 500 illustrates an approach using superposition coding to enable multi-layer communication in a multi-hop wireless network for a case with a total of K nodes. In the present example, a source node $N_1$ is to send some information data D to a destination node $N_K$ via (K−2) relays labeled $N_2$ to $N_{K-1}$.

Figure 6:
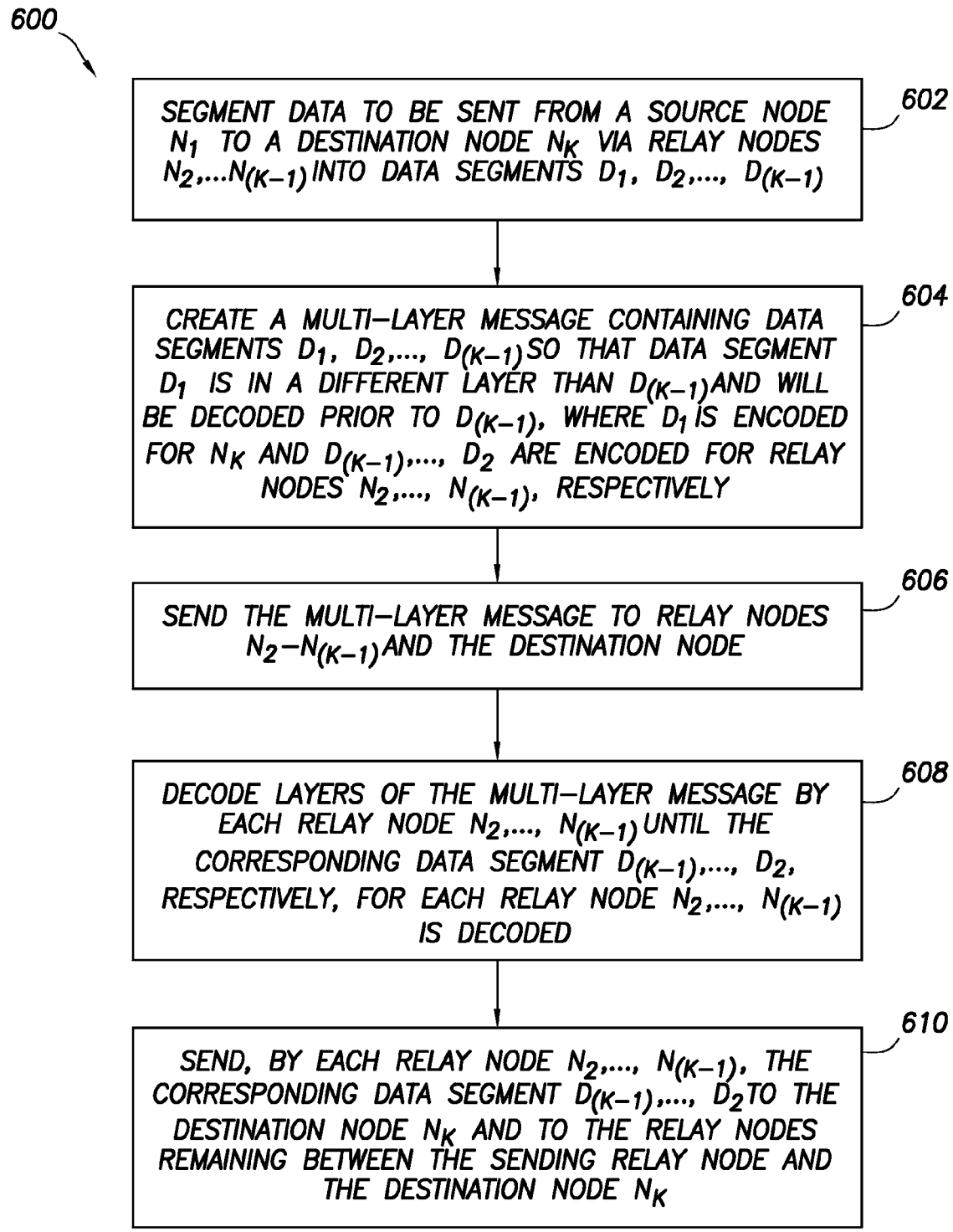
FIG. 6 is a flowchart illustrating one embodiment of a method for efficiently sending information within the relay system of FIG. 5 using superposition coding.

With additional reference to method 600 of FIG. 6, the information data D may be segmented into (K−1) segments (e.g., packets) labeled $D_1$ to $D_{(K-1)}$ as illustrated in step 602. In step 604, the source node $N_1$ encodes the packets in such a way that the packet $D_1$ is successfully decoded by node $N_K$, the packet $D_2$ by node $N_{(K-1)}$ and so on. The packet $D_{(K-1)}$ is only decoded by node $N_2$. For example, the source node $N_1$ may encode the packet $D_1$ in one layer (e.g., the highest layer) of a multi-layer message, with packets $D_2$–$D_{(K-1)}$ encoded in other layers (e.g., sequentially lower layers with packet $D_{(K-1)}$ at the lowest layer).

In step 606, the message is sent to the relay nodes $N_2$ through $N_{(K-1)}$ and destination node $N_K$. In step 608, each relay node $N_2, \ldots, N_{(K-1)}$ decodes layers of the multi-layer message until the corresponding data segment $D_{(K-1)}, \ldots, D_2$, respectively, for each relay node $N_2, \ldots, N_{(K-1)}$ is decoded. In step 610, each relay node $N_2, \ldots, N_{(K-1)}$ may send the corresponding data segments $D_{(K-1)}, \ldots, D_2$, to the destination node $N_K$ and to the relay nodes remaining between the sending relay node and the destination node $N_K$. This process may be repeated until the information data D arrives at the destination node $N_K$ and is reconstructed. Accordingly, the packets may be transmitted using superposition coding using the same resources.

In one embodiment of step 610, the node $N_2$ may transmit the packet $D_{(K-1)}$ that it received successfully by segmenting the packet into (K−2) smaller packets labeled, for example, $D_{(K-1),1}$ to $D_{(K-1),(K-2)}$. Node $N_2$ may then encode these packets $D_{(K-1),1}$ to $D_{(K-1),(K-2)}$ in such a way that packet $D_{(K-1),1}$ is successfully received by node $N_K$, packet $D_{(K-1),2}$ by node $N_{(K-1)}$ and so on.

Figure 7:
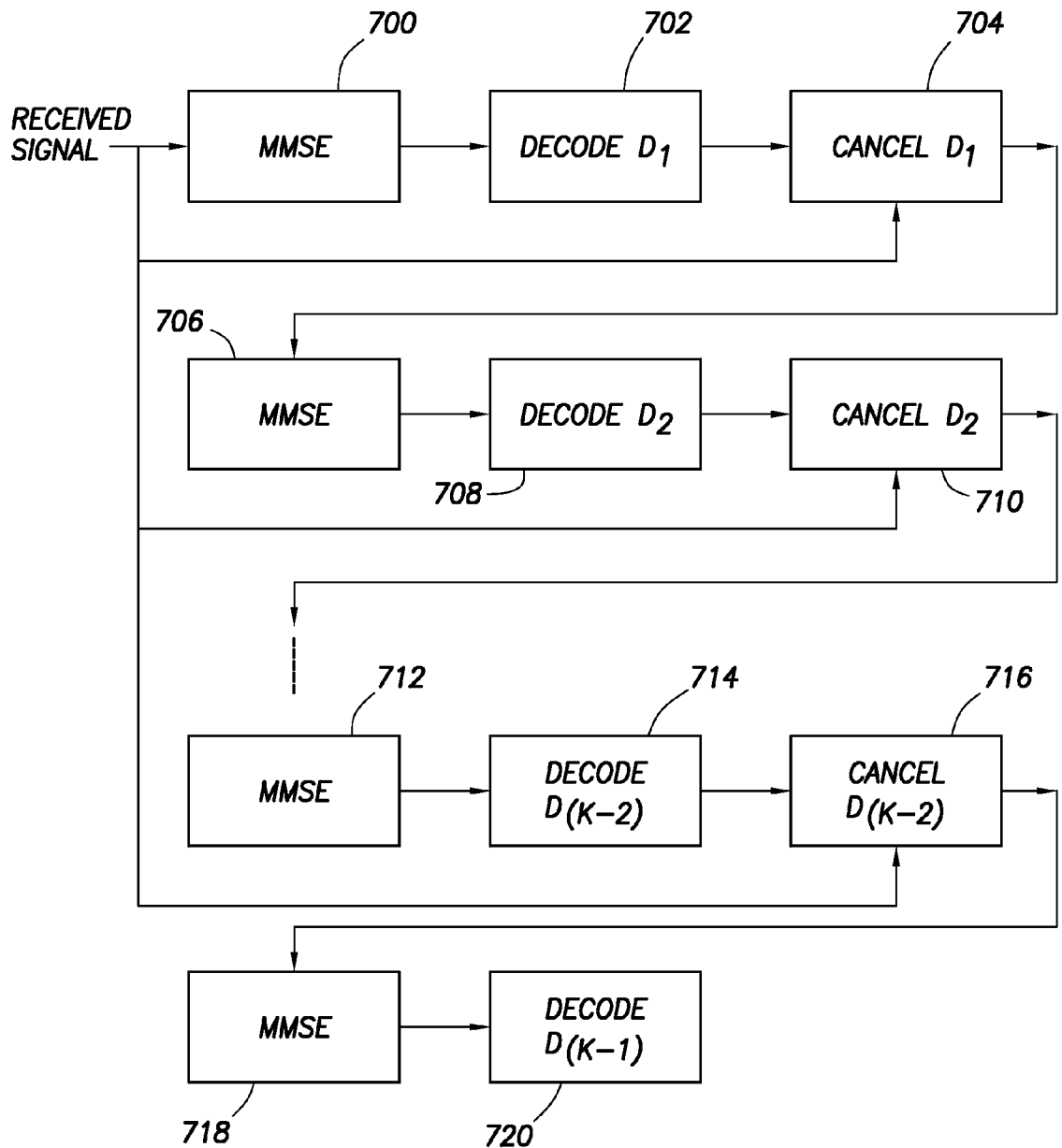
FIG. 7 illustrates one embodiment of a process by which superimposed multi-layer data may be decoded within the system of FIG. 5.

Referring to FIG. 7, an embodiment of successive interference cancellation is illustrated that may be used by one or more of the nodes $N_2$-$N_K$ of FIG. 5 to decode the signals described with respect to FIGS. 5 and 6. In general, nodes closer to the source node $N_1$ need to perform a larger number of cancellations because these nodes can decode signals destined for the farther nodes. For example, in the system 500 of FIG. 5, when the source node $N_1$ transmits packets $D_1$ through $D_{(K-1)}$, the destination node $N_K$ may receive packet $D_1$ without performing any interference cancellation. This is because the source node $N_1$ may encoded the packets $D_1$ to $D_{(K-1)}$ in such a way that packet $D_1$ can be decoded at the destination node $N_K$ without performing interference cancellation (e.g., packet $D_1$ may be in the highest (and first decoded) layer of the multi-layer message). The relay node $N_2$ that is closer to the source node $N_1$ needs to perform (K−2) interference cancellations to decode its corresponding packet $D_{(K-1)}$. Accordingly, in the present example, the farther the node performing the decoding is from the source node $N_1$, the smaller the number of cancellation steps needed. This is because nodes closer to the source node $N_1$ can always decode the signals targeted for nodes farther away from the source node. The same process may be repeated when node $N_2$ transmits packets $D_{(K-1),1}$ to $D_{(K-1),(K-2)}$. In this case, node $N_2$ becomes the source node.

In the example of FIG. 7, packets $D_1$-$D_{(K-1)}$ are encoded in sequentially lower layers of the multi-layer message. Accordingly, as described above, relay node $N_2$ needs to decode each layer until it reaches the final packet $D_{(K-1)}$ that corresponds to relay node $N_2$. To accomplish this, a minimum mean square error (MMSE) operation may be performed in block 700 and the packet $D_1$ is decoded in block 702. The decoded packet $D_1$ is then cancelled from the composite signal in block 704, and the resulting signal is fed into block 706. In block 706, an MMSE operation is performed and the next packet $D_2$ is decoded in block 708. The decoded packets $D_1$ and $D_2$ are then cancelled from the composite signal in 710, and the resulting signal is fed into the next block. Other packets may be similarly decoded. For example, in block 712, an MMSE operation is performed and the packet $D_{(K-2)}$ is decoded in block 714. The decoded packets $D_1, \ldots, D_{(K-2)}$ are then cancelled from the composite signal in 716, and the resulting signal is fed into the next block. This process may continue until the last packet in the multi-layer message is reached, which is packet $D_{(K-1)}$. An MMSE operation is performed in block 718 and packet $D_{(K-1)}$ is decoded in block 720.

It is understood that processing may end for a given relay node $N_2$-$N_{(K-1)}$ when the packet corresponding to the decoding relay node is decoded. For example, relay node $N_3$ may stop the process illustrated in FIG. 7 after decoding $D_{(K-2)}$ in block 716, and relay node $N_{(K-2)}$ may stop the process after decoding $D_2$ in block 710. Although not shown, similar decoding may occur with the segmented packets sent by each relay node (e.g., the packets $D_{(K-1),1}, D_{(K-1),2}, \ldots, D_{(K-1),(K-2)}$ sent by $N_2$ in FIG. 5).

Figure 8:
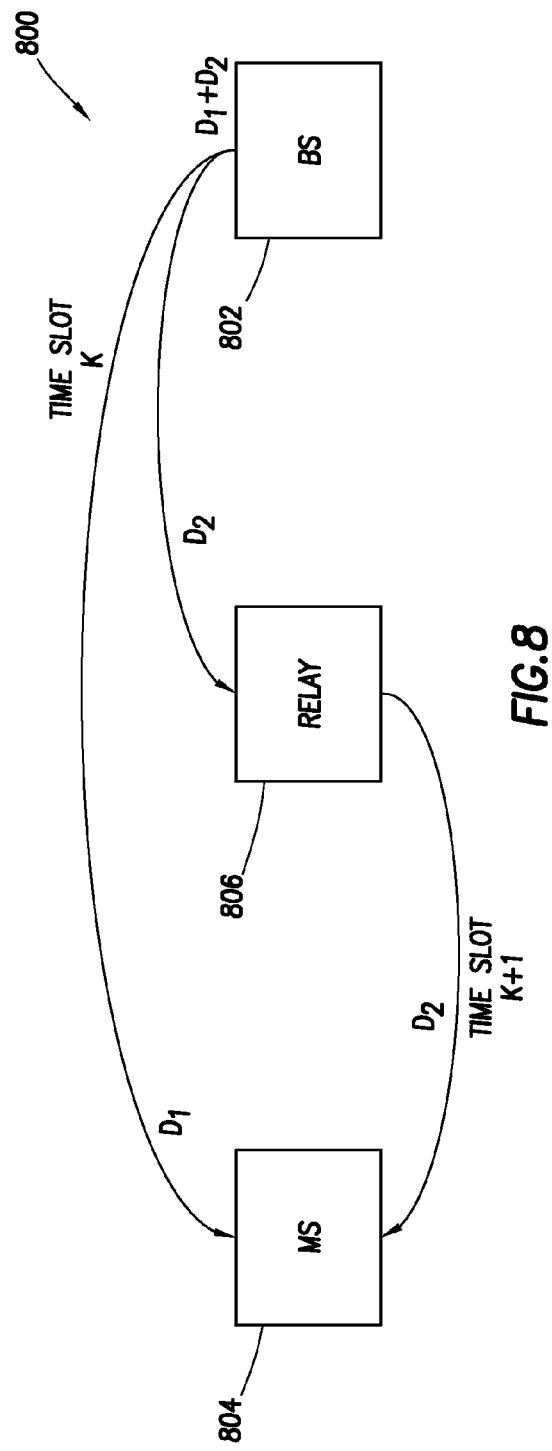
FIG. 8 is a diagram of another embodiment of a relay system.

Referring to FIG. 8, in another embodiment, a simplified example of a system 800 illustrates a base station 802 that transmits information to a mobile station 804 via a single relay 806. In the present example, the information to be transmitted, data D, is segmented into two packets $D_1$ and $D_2$, each of which may be separately encoded and modulated. The signals representing the encoded and modulated packets $D_1$ and $D_2$ may then be superimposed and an IFFT operation may be performed according to a modulation scheme such as OFDM. The superimposed signal may then be up-converted to radio frequency (RF) and transmitted from the antenna of the base station 802.

In this example, a simple superposition is used where the two encoded and modulated signals are simply added, thereby resulting in a linear superposition. For purposes of illustration, the mobile station 804, which is farther away from the base station 802 than the relay 806 and therefore may experience relatively poor channel quality with respect to the base station, can only decode packet $D_1$. However, the relay 806, being closer than the mobile station 804 to the base station 802 and possibly having more advanced reception and decoding capabilities, may decode both packets $D_1$ and $D_2$. For example, the relay 806 may first decode packet $D_1$ and cancel it from the overall received signal before decoding packet $D_2$, as described previously with respect to FIG. 7.

It is noted that the transmission format (e.g., modulation and coding) for packet $D_1$ may be chosen to ensure that it is successfully received at the mobile station 804 despite the mobile station's relatively poor channel quality. Accordingly, as the relay 806 has relatively good channel quality, the relay should be able to decode the packet $D_1$. Once the relay 806 has decoded packet $D_2$ after cancelling the signal corresponding to the packet $D_1$, it may forward the packet $D_2$ directly to the mobile station 804. The mobile station 804 may then reassemble the packet $D_1$ previously received from the base station 802 with packet $D_2$ received via the relay 806 in order to reconstruct the information of data D.

Figure 9:
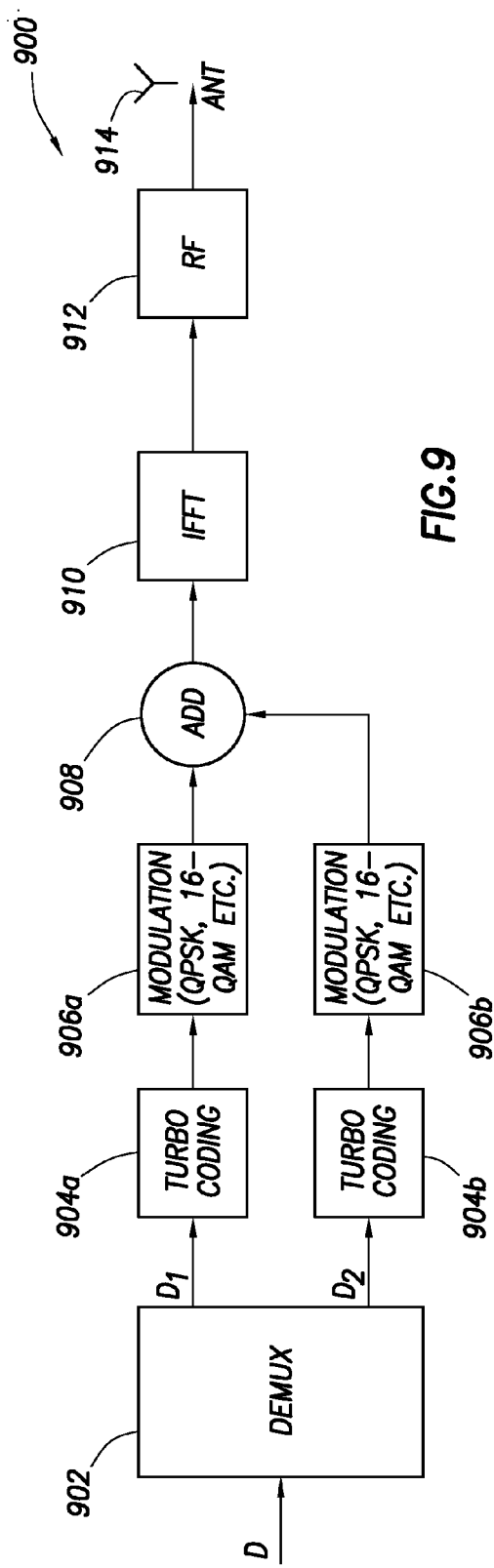
FIG. 9 is a diagram of one embodiment of a transmission system that may be used within the relay system of FIG. 8.

With additional reference to FIG. 9, a system 900 illustrates one embodiment of a system that may be used by a base station (e.g., the base station 802 of FIG. 8) for transmission. In the present example, the system 900 includes a de-multiplexing (demux) block 902, turbo coding blocks 904a and 904b, modulation blocks 906a and 906b, an addition block 908, an Inverse Fast Fourier Transform (IFFT) block 910, an RF block 912, and an antenna 914.

In the case of the data D of described above with respect to FIG. 8, the data enters the system 900 at the demux block 902, which de-multiplexes the data into packets $D_1$ and $D_2$. Packet $D_1$ passes through turbo coding block 904a and modulation block 906a for coding and modulation, and packet $D_2$ passes through turbo coding block 904b and modulation block 906b for coding and modulation. The modulated packets are superimposed in addition block 908, and passed through IFFT block 910. The resulting signal is converted to RF in RF block 912 and transmitted via antenna 914.

It is understood that separate blocks (e.g., turbo coding blocks 904a and 904b) may be implemented as a single block. Furthermore, single blocks (e.g., demux block 902) may be divided into multiple blocks. It is also understood that the described functionality of the system 900 may be implemented in hardware, software, or a combination thereof.

Figure 10:
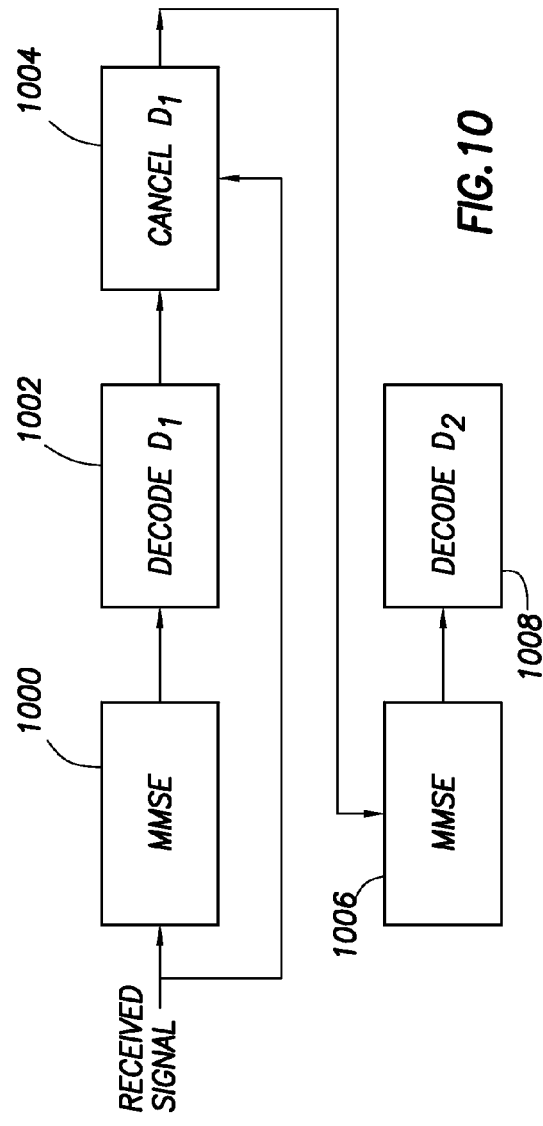
FIG. 10 illustrates one embodiment of a process by which superimposed multi-layer data may be decoded within the system of FIG. 8.

With additional reference to FIG. 10, an embodiment of successive interference cancellation is illustrated that may be used by the relay 806 and/or mobile station 804 of FIG. 8 to decode the signals transmitted by the system 900 of FIG. 9. In the example of FIG. 10, packets $D_1$ and $D_2$ are encoded in sequentially lower layers of the multi-layer message. Accordingly, relay 806 needs to decode each layer until it reaches the $D_2$. To accomplish this, an MMSE operation may be performed in block 1000 and the packet $D_1$ is decoded in block 1002. The decoded packet $D_1$ is then cancelled from the composite signal in block 1004, and the resulting signal is fed into block 1006. In block 1006, an MMSE operation is performed and the next packet $D_2$ is decoded in block 1008. Unlike relay 806, mobile station 804 only decodes packet $D_1$. Accordingly, mobile station 804 may stop the process illustrated in FIG. 10 after decoding $D_1$ in block 1002.

Figure 11:
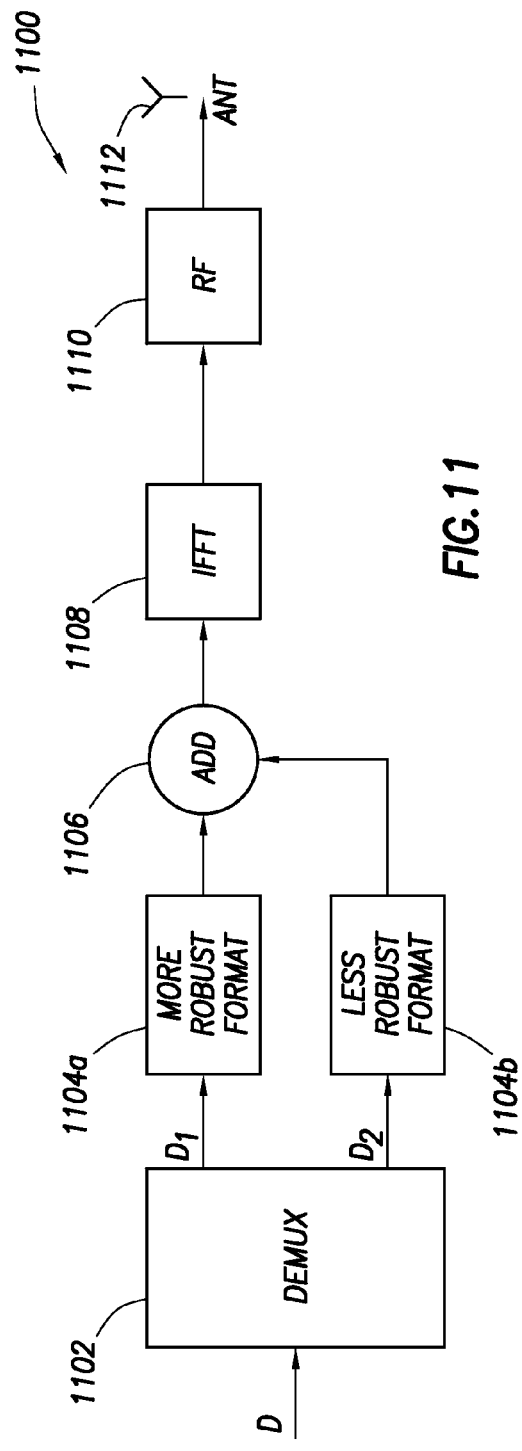
FIG. 11 is a diagram of another embodiment of a transmission system.

Referring to FIG. 11, in yet another embodiment, a system 1100 may use a more robust transmission format for $D_1$ than for $D_2$ in a system such as the system 800 of FIG. 8. The system 1100 may be similar or identical to the system 900 of FIG. 9, but may use different turbo coding and/or modulation blocks (represented by blocks 1104a and 1104b) for $D_1$ and $D_2$. As described with respect to FIG. 9, the system 1100 may also include a demux block 1102, an addition block 1106, an IFFT block 1108, an RF block 1110, and an antenna 1112.

A more robust transmission format for $D_1$ may be achieved by using a stronger code (e.g., a lower coding rate), a lower-order modulation such as QPSK, and/or a higher transmit power level or power gain. In contrast, $D_2$ may be transmitted using a less robust transmission format (e.g., a higher coding rate), higher order modulation such as 16-QAM/64-QAM, and/or a lower transmit power level. Using a more robust transmission format for $D_1$ allows reception of $D_1$ directly by the mobile station 804. However, as $D_2$ only needs to be decoded at the relay 806, it may be transmitted using the less robust transmission format. The relay 806 can also decode $D_1$ and therefore can cancel $D_1$ from the received signal, thus improving the quality of $D_2$. The relay 806 can then decode $D_2$ after interference from $D_1$ has been eliminated.

Figure 12:
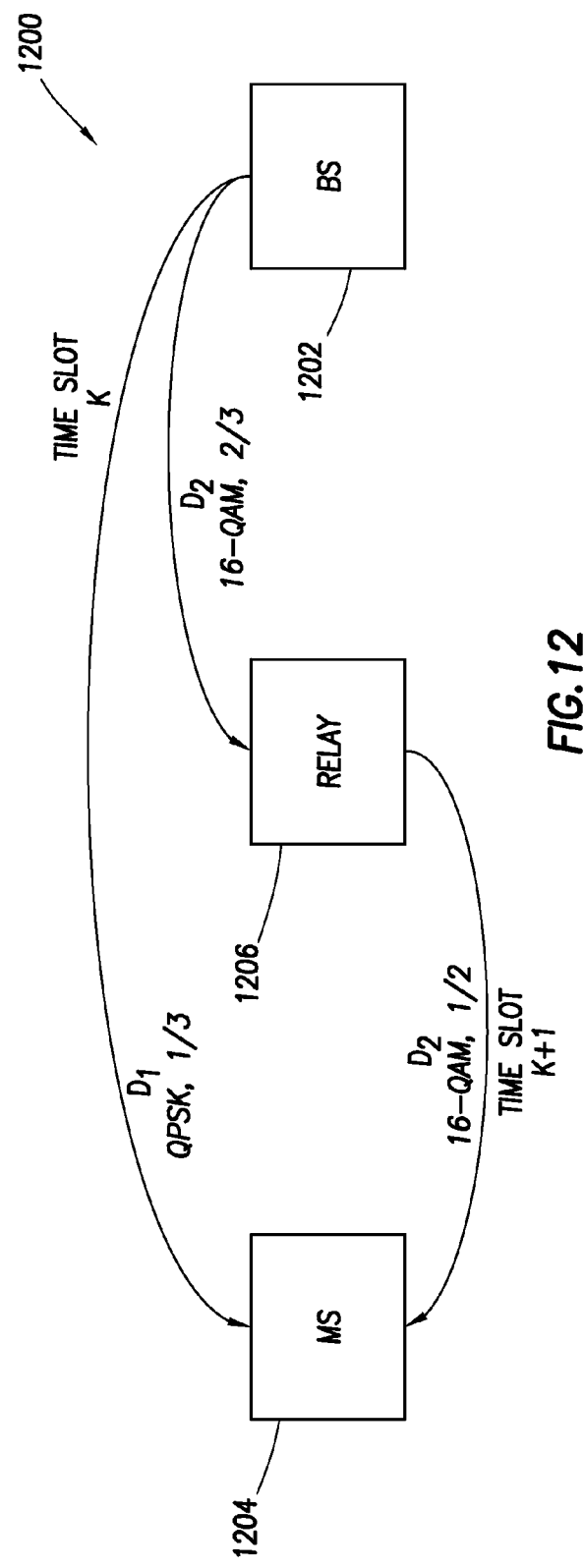
FIG. 12 is a diagram of an embodiment of a relay system that may use the transmission system of FIG. 11.

Referring to FIG. 12, in still another embodiment, a simplified example of a system 1200 illustrates a base station 1202 that transmits information to a mobile station 1204 via a single relay 1206. In the present example, the information to be transmitted, data D, is segmented into two packets $D_1$ and $D_2$, each of which may be separately encoded and modulated. The base station 1202 may use the system 1100 of FIG. 11, whereby $D_1$ and $D_2$ are transmitted using different levels of robustness.

For example, $D_1$ may be transmitted using a relatively robust QPSK modulation scheme with a 1/3 strong coding rate. This provides a 2/3 bits per symbol information rate. $D_2$ may be transmitted with less robust modulation and coding using 16-QAM with a 2/3 coding rate. This provides an information rate of 8/3 bits per symbol. Therefore, the number of bits received at the relay 1206 is four times greater than the number of bits received at the mobile station 1204. After accounting for what has already been received at the mobile station 1204, the relay 1206 needs to transmit at an information rate of 8/3−2/3=2 bits per symbol. This rate may be achieved by using 16-QAM and a 1/2 coding rate between the relay 1206 and the mobile station 1204.

Referring to FIG. 13, in another embodiment, a simplified example of a system 1300 illustrates a base station 1302 that transmits information to a mobile station 1304 via a single relay 1306. The information to be transmitted, data D, may be segmented into two packets $D_1$ and $D_2$, each of which may be separately encoded and modulated.

In the present example, a hierarchical modulation approach is used where the relay 1306 decodes the signal as a higher constellation than the mobile station 1304. It should be noted that the relay 1306 generally experiences better reception quality than the mobile station 1304 and therefore is capable of decoding the signal at a higher constellation. The mobile station 1304, which experiences relatively poor channel quality, may decode the signal as a lower constellation.

With additional reference to FIGS. 14A and 14B, an example is illustrated where the base station 1302 of FIG. 13 wants to communicate the information '0010' to the mobile station 1304 via the relay 1306. To accomplish this, the base station 1302 may transmit '0010' in such a way that a QPSK constellation carrying the information '00' is embedded within a 16-QAM constellation carrying the information '0010'. As stated previously, QPSK carries two bits per symbol while 16-QAM carries four bits per symbol.

The mobile station 1304 decodes the signal assuming a QPSK constellation and therefore decodes the first piece of the information received in time slot K as '00' (FIG. 14A). The relay 1306 decodes the signal as a full 16-QAM constellation and is therefore able to decode the entire '0010' (FIG. 14A). The relay 1306 knows that the mobile station 1304 has already decoded '00' as a QSPK constellation. Accordingly, the relay 1306 transmits the second part of the information as '10', which are two bits of information, as a QPSK constellation in time slot K+1 (FIG. 14B). Since the mobile station 1304 is able to decode a QPSK constellation, it can decode the information '10' transmitted from the relay 1306. The mobile station 1304 can then put together the '00' previously received from the base station 1302 with the '10' received via the relay 1306 to decode the overall transmitted information '0010'.

Figure 15:
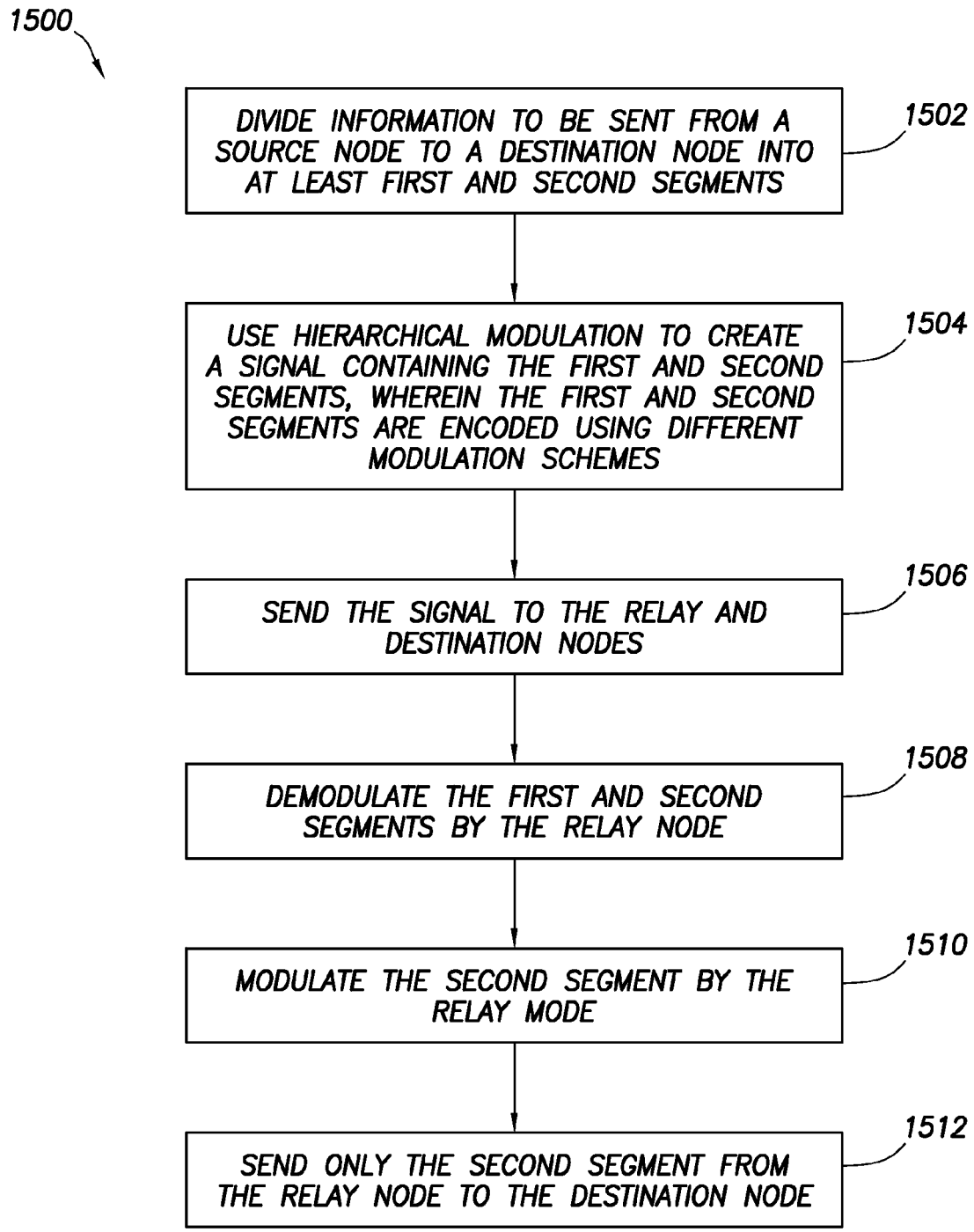
FIG. 15 is a flowchart illustrating one embodiment of a method for efficiently sending information within a relay system using hierarchical modulation.

Referring to FIG. 15, in one embodiment, a method 1500 may use hierarchical modulation in a multi-hop wireless network, such as the system 1300 of FIG. 13. Information is to be sent from a source node (e.g., the base station 1302) to a destination node (e.g., the mobile station 1304) via one or more relay nodes (e.g., the relay node 1306). Although the present example is described using a single relay node, it is understood that it may be applied to a system having any number of relay nodes.

In step 1502, information to be sent from the base station 1302 to the mobile station 1304 via the relay 1306 is divided into at least first and second segments. In step 1504, hierarchical modulation is used to create a signal containing the first and second segments for transmission from the base station 1302. The first segment is modulated using a first modulation scheme (e.g., QPSK) and the second segment is modulated using a second modulation scheme (e.g., QAM). The signal is then sent from the base station 1302 to the relay 1306 and the mobile station 1304 in step 1506. In step 1508, the signal is demodulated by the relay 1306 to recover the second segment. In step 1510, the relay 1306 then modulates the second segment using a third modulation scheme (which may be the same as or different from the first and second modulation schemes) and, in step 1512, sends only the second segment to the mobile station 1304.

Figure 16:
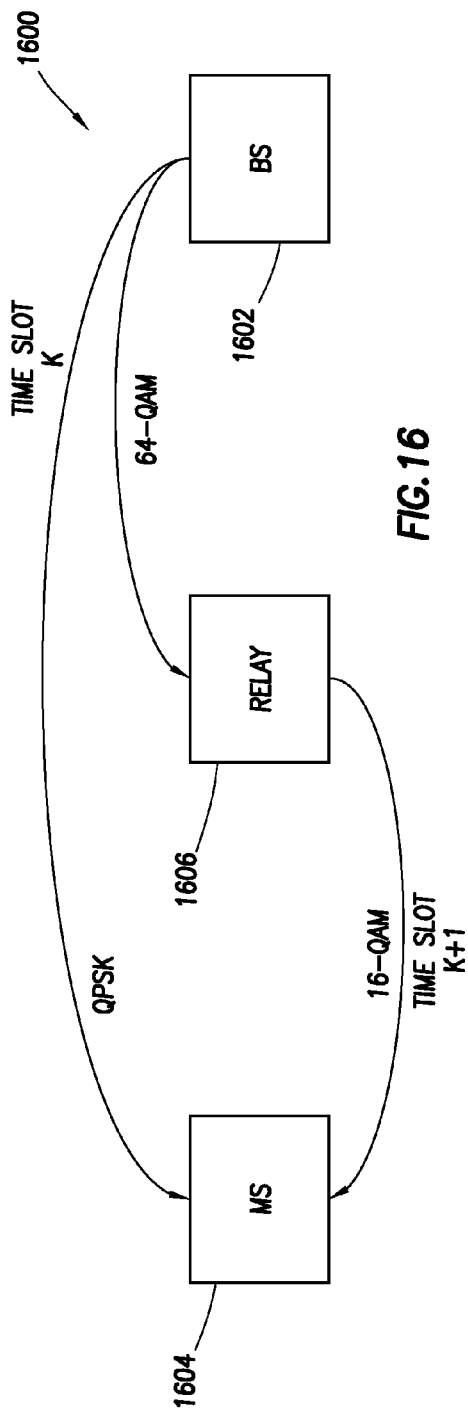
FIG. 16 is a diagram of an embodiment of a relay system that may use the hierarchical modulation of FIG. 15.

Referring to FIG. 16, in another embodiment, a simplified example of a system 1600 illustrates a base station 1602 that transmits information to a mobile station 1604 via a single relay 1606. The information to be transmitted, data D, may be segmented into two packets $D_1$ and $D_2$, each of which may be separately encoded and modulated.

In the present example, the base station 1602 embeds a QPSK constellation within a 64-QAM constellation and sends the signal in time slot K to the relay 1606 and mobile station 1604. The 64-QAM constellation carries a total of six bits. The mobile station 1604 decodes the signal as a QPSK constellation (i.e., at two bits per symbol). The relay 1606 decodes the signal as a 64-QAM constellation (i.e., six bits per symbol). The relay 1606 then forwards the additional four bits of information that were not received by the mobile station 1604 as a 16-QAM constellation in time slot K+1. It should be noted that the link between the relay 1606 and the mobile station 1604 may experience better quality than the link between the base station 1602 and the mobile station 1604, and therefore the mobile station may be able to decode a 16-QAM constellation on the link between the relay and the mobile station but not on the link between the base station and the mobile station.

Figure 17:
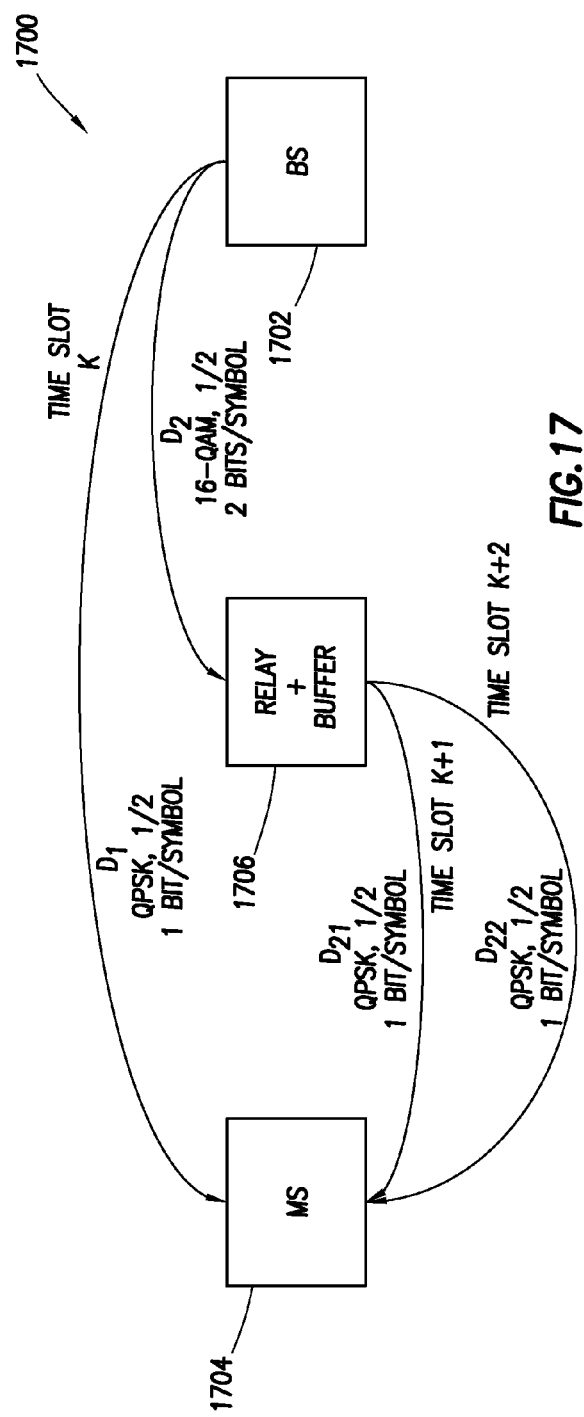
FIG. 17 is a diagram of an embodiment of a relay system that may use buffering with superposition coding and/or hierarchical modulation.

Referring to FIG. 17, in another embodiment, a simplified example of a system 1700 illustrates a base station 1702 that transmits information to a mobile station 1704 via a single relay 1706 using superposition coding and/or hierarchical modulation. The information to be transmitted, data D, may be segmented into two packets $D_1$ and $D_2$, each of which may be separately encoded and modulated.

In the present example, the relay 1706 includes relay buffering. The data rate (e.g., two bits per symbol) to the relay 1706 from the base station 1702 is higher than the data rate (e.g., one bit per symbol) to the mobile station 1704 from the base station. In operation, the base station 1702 transmits $D_1$ and $D_2$ using superposition coding or hierarchical modulation in time slot K. In this example, superposition coding of $D_2$ is done on $D_1$, with $D_1$ coding and modulation performed using QPSK modulation with a 1/2 coding rate and $D_2$ coding and modulation performed using 16-QAM modulation with a 1/2 coding rate. $D_1$ is directly received at the mobile station 1704, while the relay 1706 decodes both $D_1$ and $D_2$. The relay 1706 only needs to forward $D_2$ to the mobile station 1704 because the mobile station has already received $D_1$. It should be noted that the size of $D_2$ is twice as large as $D_1$ because $D_2$ is transmitted at two bits per symbol while $D_1$ is transmitted at one bit per symbol from the base station 1702.

The relay 1706 segments $D_2$ into two smaller packets $D_{2(1)}$ and $D_{2(2)}$ and forwards these packets to the mobile station 1704. However, as the data rate at the relay 1706's outgoing link to the mobile station 1704 is only one bit per symbol, the relay forwards $D_{2(1)}$ and $D_{2(2)}$ in two different slots K+1 and K+2 at a data rate of one bit per symbol each. During the transmission of $D_{2(1)}$, the relay 1706 keeps $D_{2(2)}$ in its buffer. It should be noted that other forms of transmission and channelization strategies may also be employed for the transmission of buffered data from the relay 1706. In case of an OFDM system, for example, the relay 1706 may forward $D_{2(1)}$ and $D_{2(2)}$ simultaneously on orthogonal subcarriers.

In the present disclosure, it is understood that certain terms are used for purposes of example and are not intended to be limiting. For example, a mobile station is frequently used herein as an example of a destination node, but it is understood that many different devices or system components may be a destination node. Similarly, base stations and relays are frequently used herein as examples of a source node, but it is understood that many different devices or system components may be a source node. In addition, it is understood that a relay node may not be dedicated to relaying signals or portions of signals, but may be any device or system components that is capable of such functionality. Each source node, relay node, and destination node may include one or more processors, memories, and other components for storing and executing instructions to accomplish the described functionality.

Although only a few exemplary embodiments of this disclosure have been described in detail above, those skilled in the art will readily appreciate that many modifications are possible in the exemplary embodiments without materially departing from the novel teachings and advantages of this disclosure. For example, various features described herein may be implemented in hardware, software, or a combination thereof. Also, features illustrated and discussed above with respect to some embodiments can be combined with features illustrated and discussed above with respect to other embodiments. For example, various steps from different flow charts may be combined, performed in an order different from the order shown, or further separated into additional steps. Furthermore, steps may be performed by network elements other than those disclosed. Accordingly, all such modifications are intended to be included within the scope of this disclosure.

What is claimed is:

1. A method comprising:
   dividing information to be sent from a source node to a destination node via at least one relay node into at least first and second segments;
   generating a signal containing the first and second segments for transmission from the source node, wherein the first and second segments are independently encoded within the signal;
   sending the signal containing the first and second segments from the source node directly to both the relay node and the destination node;
   recovering only the first segment from the signal by the destination node;

recovering the first and second segments from the signal by the relay node and sending the second segment from the relay node to the destination node without the first segment; and
combining the first and second segments by the destination node to reconstruct the information.

2. The method of claim 1 wherein generating the signal includes superposition coding the first and second segments, wherein the first segment is encoded in a different layer of the signal than the second segment.

3. The method of claim 2 further comprising:
dividing the second segment into at least third and fourth segments by the relay node;
sending the third segment to the destination node; and
sending the fourth segment to another node positioned between the destination node and the relay node.

4. The method of claim 3 further comprising superposition coding the third and fourth segments, wherein both the third and fourth segments are sent to the other node and the destination node.

5. The method of claim 2 further comprising modulating the first segment using a first modulation scheme and modulating the second segment using a second modulation scheme that is less robust than the first modulation scheme.

6. The method of claim 1 wherein generating the signal includes encoding the first segment in a first modulation constellation and encoding the second segment in a second modulation constellation that is higher than the first modulation constellation, wherein the first modulation constellation is embedded in the second modulation constellation.

7. The method of claim 1 further comprising:
dividing the second segment into at least third and fourth segments by the relay node;
sending the third segment to the destination node in a first time slot;
buffering the fourth segment; and
sending the fourth segment to the destination node in a second time slot following the first time slot.

8. A method comprising:
segmenting data to be sent from a source node $N_1$ to a destination node ($N_K$) via relay nodes ($N_2, \ldots, N_{(K-1)}$) into data segments ($D_1, D_2, \ldots, D_{(K-1)}$);
creating a multi-layer message containing the data segments ($D_1, D_2, \ldots, D_{(K-1)}$) such that each data segment is in a separate layer of the multi-layer message, wherein the first data segment ($D_1$) is encoded for the destination node ($N_K$) and the data segments ($D_{(K-1)}, \ldots, D_2$) are each encoded the multi-layer message for relay nodes ($N_2, \ldots, N_{(K-1)}$), respectively;
sending the multi-layer message from the source node directly to all the relay nodes ($N_2$ through $N_{(K-1)}$) and destination node ($N_K$);
decoding layers of the multi-layer message by each relay node ($N_2, \ldots, N_{(K-1)}$) sequentially from the first data segment ($D_1$) until the corresponding data segment ($D_{(K-1)}, \ldots, D_2$), respectively, for each relay node ($N_2, \ldots, N_{(K-1)}$) is decoded; and
sending, by each relay node ($N_2, \ldots, N_{(K-1)}$), the corresponding data segments ($D_{(K-1)}, \ldots, D_2$) to the destination node ($N_K$) and to the relay nodes remaining between the sending relay node and the destination node ($N_K$).

9. The method of claim 8 further comprising:
Segmenting the last data segment ($D_{(K-1)}$) received by relay node ($N_2$) into data segments ($D_{(K-1), 1}, \ldots D_{(K-1),(K-2)}$);
creating a multi-layer message containing the data segments ($D_{(K-1),1}, D_{(K-1),2}, \ldots, D_{(K-1),(K-2)}$) so that a second data segment ($D_{(K-1),1}$) is in a different layer of the multi-layer message than a third data segment ($D_{(K-1),(K-2)}$) and will be decoded prior to the third data segment ($D_{(K-1),(K-2)}$), wherein the second data segment ($D_{(K-1),1}$) is encoded for destination node ($N_K$) and data segments ($D_{(K-1),(K-2)}, \ldots, D_{(K-1),2}$) are encoded in different layers of the multi-layer message than $D_{(K-1),1}$ for relay nodes ($N_3, \ldots, N_{(K-1)}$), respectively;
sending the multi-layer message to the relay nodes ($N_3$ through $N_{(K-1)}$) and destination node ($N_K$); and
decoding layers of the multi-layer message by each relay node ($N_3, \ldots, N_{(K-1)}$) until the corresponding data segment ($D_{(K-1),(K-2)}, \ldots, D_{(K-1),2}$), respectively, for each relay node ($N_3, \ldots, N_{(K-1)}$) is decoded.

10. The method of claim 9 further comprising:
sending, by each relay node ($N_3, \ldots, N_{(K-1)}$), the corresponding data segments ($D_{(K-1),(K-2)}, \ldots, D_{(K-1),2}$) to the destination node ($N_K$) and to the relay nodes remaining between the sending relay node and the destination node ($N_K$).

11. The method of claim 8 further comprising applying a different modulation scheme to each of the first and second segments.

12. The method of claim 8 further comprising applying a different coding rate to each of the first and second segments.

13. The method of claim 8 further comprising segmenting data segment ($D_{(K-1)}$) received by relay node $N_2$ into data segments ($D_{(K-1),1}, \ldots, D_{(K-1),(K-2)}$);
buffering at least a portion of the data segments ($D_{(K-1),1}, \ldots D_{(K-1),(K-2)}$);
sending the non-buffered portion of the data segments ($D_{(K-1),1}, \ldots, D_{(K-1),(K-2)}$) in a first time slot; and
sending at least some of the buffered portion of the data segments ($D_{(K-1),1}, \ldots D_{(K-1),(K-2)}$) in a second time slot following the first time slot.

14. A method comprising:
dividing information to be sent from a source node to a destination node via a relay node into at least first and second segments;
using hierarchical modulation to create a signal containing the first and second segments for transmission from the source node, wherein the first segment is modulated using a first modulation scheme and wherein the second segment is modulated using a second modulation scheme;
sending the signal containing the first and second segments from the source node directly to both the relay node and the destination node;
demodulating the signal by the relay node to recover the second segment;
modulating the second segment using a third modulation scheme; and
sending only the second segment from the relay node to the destination node.

15. The method of claim 14 wherein the first modulation scheme is Quadrature Phase Shift Keying (QPSK) modulation and the second modulation scheme is Quadrature Amplitude Modulation (QAM) modulation.

16. The method of claim 14 wherein the first and third modulation schemes are identical.

17. The method of claim 14 wherein the second and third modulation schemes are identical.

18. The method of claim 14 further comprising applying a different coding rate to each of the first and second segments.

19. The method of claim 14 further comprising:
dividing the second segment into at least third and fourth segments by the relay node;

sending the third segment to the destination node in a first time slot;
buffering the fourth segment; and
sending the fourth segment in a second time slot following the first time slot.

20. A system comprising:
a source node having a first memory coupled to a first processor;
at least one relay node having a second memory coupled to a second processor; and
a plurality of instructions stored in the first and second memories for execution by the first and second processors, the instructions including instructions for:
dividing information to be sent from the source node to a destination node via the relay node into at least first and second segments;
generating a signal containing the first and second segments for transmission from the source node, wherein the first and second segments are each independently encoded within the signal;
sending the signal containing the first and second segments from the source node directly to both the relay node and the destination node; and
recovering the first and second segments by the relay node and sending the second segment from the relay node to the destination node without the first segment, wherein the destination node is able to reconstruct the information by combining the first segment sent by the source node with the second segment sent by the relay node.

21. The system of claim 20 wherein the instructions for generating the signal include instructions for superposition coding the first and second segments, wherein the first segment is encoded in a different layer of the signal than the second segment.

22. The system of claim 21 further comprising instructions for modulating the first segment using a first modulation scheme and modulating the second segment using a second modulation scheme that is less robust than the first modulation scheme.

23. The system of claim 20 wherein the instructions for generating the signal include instructions for encoding the first segment in a first modulation constellation and encoding the second segment in a second modulation constellation that is higher than the first modulation constellation, wherein the first modulation constellation is embedded in the second modulation constellation.

\* \* \* \* \*